(12) United States Patent
Tanaka et al.

(10) Patent No.: US 10,828,975 B2
(45) Date of Patent: Nov. 10, 2020

(54) FLUID-FILLED VIBRATION DAMPING DEVICE

(71) Applicant: SUMITOMO RIKO COMPANY LIMITED, Komaki (JP)

(72) Inventors: Shingo Tanaka, Komaki (JP); Yasuhiro Komiya, Komaki (JP); Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 13 days.

(21) Appl. No.: 16/270,920

(22) Filed: Feb. 8, 2019

(65) Prior Publication Data

US 2019/0168595 A1 Jun. 6, 2019

Related U.S. Application Data

(63) Continuation of application No. PCT/JP2018/010982, filed on Mar. 20, 2018.

(30) Foreign Application Priority Data

Jul. 7, 2017 (JP) ................. 2017-133929

(51) Int. Cl.
*F16F 13/10* (2006.01)
*B60K 5/12* (2006.01)

(52) U.S. Cl.
CPC .............. *B60K 5/1208* (2013.01); *B60K 5/12* (2013.01); *F16F 13/10* (2013.01); *F16F 13/103* (2013.01);

(Continued)

(58) Field of Classification Search
CPC ........ F16F 13/10; F16F 13/107; F16F 13/108; F16F 13/08; B60K 5/12

(Continued)

(56) References Cited

U.S. PATENT DOCUMENTS 5,386,973 A * 2/1995 Brenner ................ F16F 13/108
267/140.13
9,334,922 B2 5/2016 Okumura
(Continued)

FOREIGN PATENT DOCUMENTS

JP 4272380 B2 6/2009

OTHER PUBLICATIONS

Jun. 19, 2018 International Search Report issued in International Patent Application No. PCT/JP2018/010982.

*Primary Examiner* — Christopher P Schwartz
(74) *Attorney, Agent, or Firm* — Oliff PLC

(57) ABSTRACT

A fluid-filled vibration damping device including an inner member, an outer member having a tubular part whose radially inner surface has a quadrangular tube shape, a main rubber elastic body elastically connecting the two members, and a partition having a quadrangular plate shape disposed on a radially inner side of the tubular part. An outer peripheral surface of an axial end of the main rubber elastic body is anchored to the radially inner surface of the tubular part. An annular sealing rubber pressed against an outer peripheral edge of an axial end face of the partition is provided to the axial end of the main rubber elastic body. An axis-perpendicular inside dimension and a width dimension of the sealing rubber are made larger in a diagonal direction of the radially inner surface of the tubular part than in an opposite side direction thereof.

6 Claims, 12 Drawing Sheets

(52) U.S. Cl.
CPC ..... *F16F 2224/025* (2013.01); *F16F 2230/30* (2013.01)

(58) Field of Classification Search
USPC .............. 267/140.11–140.13, 140.2–140.5, 267/141.1–141.7; 248/550, 562
See application file for complete search history.

(56) References Cited

U.S. PATENT DOCUMENTS

| | | | |
|---|---|---|---|
| 2015/0184717 A1* | 7/2015 | Kojima | F16F 13/107 267/140.11 |
| 2018/0023655 A1* | 1/2018 | Komiya | F16F 13/10 267/140.13 |
| 2019/0168596 A1* | 6/2019 | Komiya | B60K 5/12 |

* cited by examiner

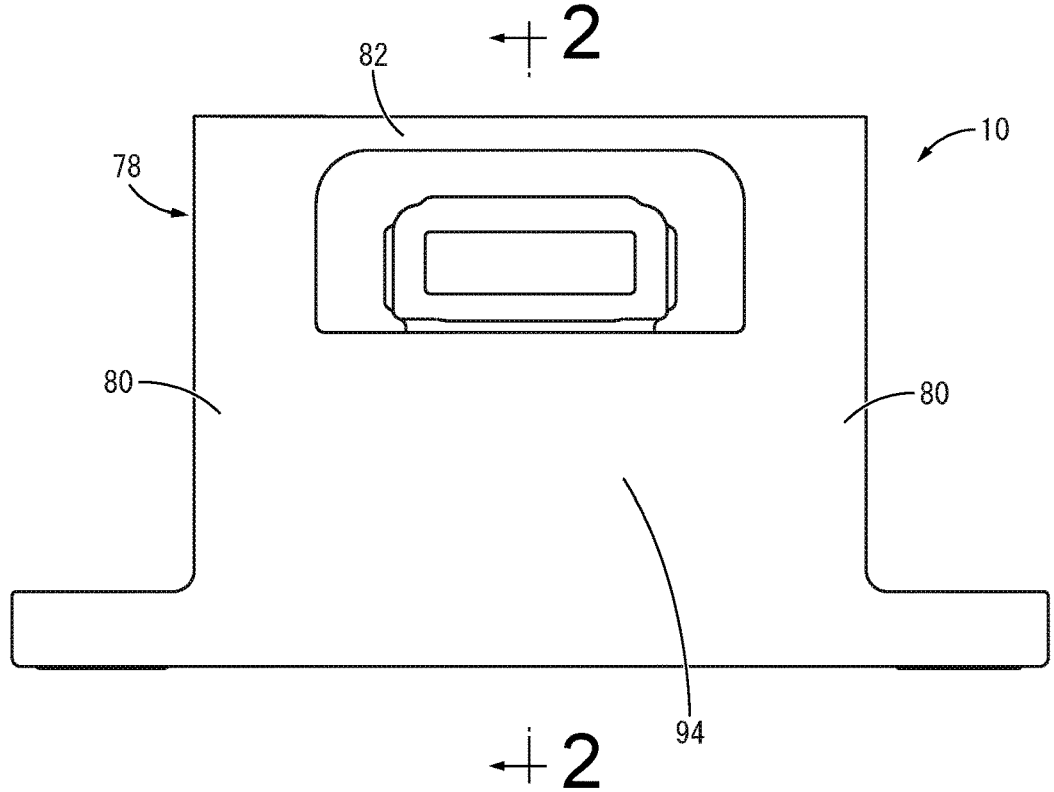
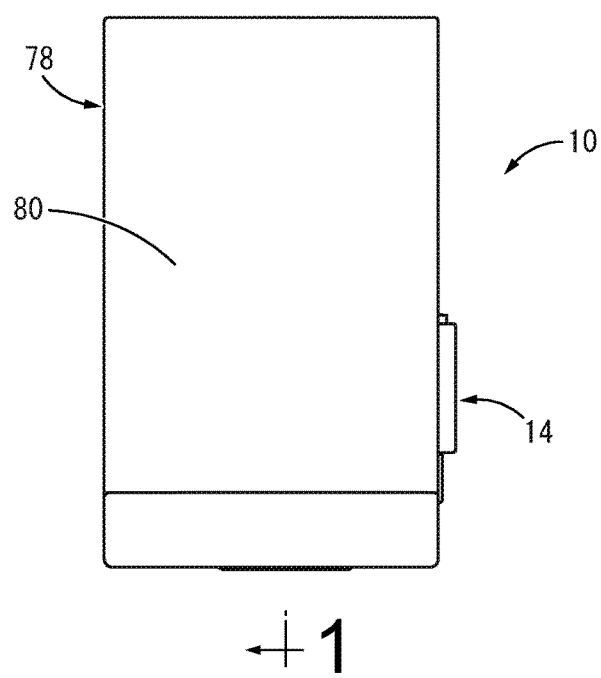

FLUID-FILLED VIBRATION DAMPING DEVICE

INCORPORATED BY REFERENCE

This application is a Continuation of International Application No. PCT/JP2018/010982 filed Mar. 20, 2018, which claims priority under 35 U.S.C. §§ 119(a) and 365 of Japanese Patent Application No. 2017-133929 filed on Jul. 7, 2017, the disclosures of which are expressly incorporated herein by reference in their entireties.

BACKGROUND OF THE INVENTION

1. Field of the Invention

The present invention relates generally to a vibration damping device used for an automotive engine mount and the like, and more particularly to a fluid-filled vibration damping device utilizing a vibration damping effect based on flow action of a fluid filling the interior and the like.

2. Description of the Related Art

Conventionally, vibration damping devices used for automotive engine mounts and the like are known. As disclosed in, for example, U.S. Pat. No. 9,334,922, the vibration damping device includes a first attachment member and a second attachment member respectively attached to one and the other of components that make up a vibration transmission system such as a power unit and a vehicle body, and a main rubber elastic body elastically connecting the two members to each other.

Also, for the purpose of improving vibration damping ability with respect to a specific vibration or the like, a fluid-filled vibration damping device utilizing a vibration damping effect based on a resonance action or the like of a fluid filling the interior is also proposed as one type of the vibration damping device from the past. The fluid-filled vibration damping device of U.S. Pat. No. 9,334,922 has a structure in which a pressure-receiving chamber and an equilibrium chamber filled with a non-compressible fluid are respectively formed on one and the other sides of a partition disposed on the radially inner side of the second attachment member, and an orifice passage through which the pressure-receiving chamber and the equilibrium chamber communicate with each other is formed in the partition.

Meanwhile, in the fluid-filled vibration damping device, the partition inserted in the second attachment member is pressed against the axial end face of the main rubber elastic body at the outer peripheral edge of the axial end face, and the partition is positioned at a predetermined position in the axial direction with respect to the second attachment member. Therefore, by obtaining a large superposed area between the axial end face of the main rubber elastic body and the outer peripheral edge of the axial end face of the partition, it is possible to effectively position the partition.

However, if the axial end portion of the main rubber elastic body is thickened in the axis-perpendicular direction, the inside dimension in the axis-perpendicular direction of the pressure-receiving chamber becomes small and the effective piston surface area of the pressure-receiving chamber becomes small. Therefore, during input of vibration, the amount of fluid flow through the orifice passage decreases, and the vibration damping effect based on the flow action of the fluid is reduced. In addition, since the free length of the main rubber elastic body is shortened, there may be a case where deterioration in durability of the main rubber elastic body becomes a problem. On the other hand, if the axial end portion of the main rubber elastic body is thinned in the axis-perpendicular direction in order to obtain a large effective piston surface area of the pressure-receiving chamber, the superposed area between the axial end face of the main rubber elastic body and the outer peripheral edge of the axial end face of the partition becomes small. Accordingly, there is a risk that the partition may move in the axial direction when the internal pressure of the pressure-receiving chamber drops greatly, for example. Therefore, with the fluid-filled vibration damping device of the conventional structure, it is necessary to set the radial width dimension of the axial end portion of the main rubber elastic body with high accuracy depending on the required vibration damping ability, durability, the size of assumed input load, or the like.

SUMMARY OF THE INVENTION

It is therefore one object of this invention to provide a fluid-filled vibration damping device of novel structure which is able to stably position the partition in the axial direction with respect to the outer member, while realizing excellent vibration damping ability and durability.

The above and/or optional objects of this invention may be attained according to at least one of the following preferred embodiments of the invention. The following preferred embodiments and/or elements employed in each preferred embodiment of the invention may be adopted at any possible optional combinations.

A first preferred embodiment of the present invention provides a fluid-filled vibration damping device comprising: an inner member; an outer member including a tubular part; a main rubber elastic body elastically connecting the inner member and the outer member to each other; a partition disposed on a radially inner side of the tubular part of the outer member; a primary liquid chamber and an auxiliary liquid chamber formed on opposite sides of the partition, the primary liquid chamber and the auxiliary liquid chamber being filled with a non-compressible fluid; and an orifice passage through which the primary liquid chamber and the auxiliary liquid chamber communicate with each other, the orifice passage being formed in the partition, wherein a radially inner surface of the tubular part of the outer member has a quadrangular tube shape, the partition has a quadrangular plate shape corresponding to the radially inner surface of the tubular part, and is disposed on the radially inner side of the tubular part, an outer peripheral surface of an axial end portion of the main rubber elastic body is anchored to the radially inner surface of the tubular part, an annular sealing rubber pressed against an outer peripheral edge of an axial end face of the partition is provided to the axial end portion of the main rubber elastic body, an inside dimension in an axis-perpendicular direction of the sealing rubber is made larger in a diagonal direction of the radially inner surface of the tubular part than in an opposite side direction thereof, and a width dimension of the sealing rubber is made larger in the diagonal direction of the radially inner surface of the tubular part than in the opposite side direction thereof.

According to the fluid-filled vibration damping device structured following the first preferred embodiment, both the inside dimension in the axis-perpendicular direction and the width dimension of the sealing rubber are made larger in the diagonal direction of the radially inner surface of the tubular part than in the opposite side direction thereof, so that abutting area between the partition and the sealing rubber greatly obtained at the corner. Therefore, the partition is more stably positioned in the axial direction by abutting against the axial end face of the sealing rubber, and the sealing performance exhibited by the partition being pressed against the axial end face of the sealing rubber may also be improved.

Moreover, the outer peripheral surface of the axial end portion of the main rubber elastic body has a quadrangular tube shape corresponding to the radially inner surface of the tubular part, and the free length of the main rubber elastic body is readily obtained longer in the diagonal direction than in the opposite side direction. Accordingly, by obtaining the inside dimension in the diagonal direction of the sealing rubber larger than the inside dimension in the opposite side direction thereof while setting the width dimension of the corner of the sealing rubber larger than the width dimension of the side thereof, it is possible to obtain the free length of the main rubber elastic body sufficiently long and suppress the influence on durability and spring characteristics of the main rubber elastic body, while improving positioning of the partition in the axial direction and sealing properties between the partition and the sealing rubber, or the like.

A second preferred embodiment of the present invention provides the fluid-filled vibration damping device according to the first preferred embodiment, wherein a corner of the radially inner surface of the tubular part has an arcuate curved surface, and a corner of a radially inner surface of the sealing rubber positioned in the diagonal direction of the radially inner surface of the tubular part has an arcuate curved surface whose curvature radius is larger than that of the corner of the radially inner surface of the tubular part.

According to the second preferred embodiment, since the corner of the radially inner surface of the tubular part has an arcuate curved surface, the outer peripheral surface of the partition and the outer peripheral surface of the sealing rubber having a shape corresponding to the radially inner surface of the tubular part each have an arcuate curved surface at the corner. By so doing, the axial end face of the sealing rubber and the outer peripheral edge of the axial end face of the partition are readily pressed effectively up to the outer peripheral end at the corner, so that a substantial superposed area can be largely obtained.

Furthermore, since the curvature radius of the corner of the radially inner surface of the sealing rubber is made larger than that of the corner of the outer peripheral surface thereof, a large width dimension of the sealing rubber can be obtained at the corner. In particular, it is possible to prevent the width dimension of the sealing rubber from suddenly changing in the circumferential direction, thereby, for example, improving durability due to dispersion of stress upon elastic deformation of the main rubber elastic body at the time of vibration input, or the like.

A third preferred embodiment of the present invention provides the fluid-filled vibration damping device according to the first or second preferred embodiment, wherein a portion of the sealing rubber of the main rubber elastic body, the portion being positioned on the radially inner side of a side of the radially inner surface of the tubular part, extends in a circumferential direction with a substantially constant width dimension.

According to the third preferred embodiment, by making the width dimension substantially constant in the side of the sealing rubber having the width dimension smaller than that of the corner, it is possible to obtain necessary sealing performance about the entire circumference.

A fourth preferred embodiment of the present invention provides the fluid-filled vibration damping device according to any one of the first to third preferred embodiments, wherein a press-sealing face positioned on the outer peripheral edge of the axial end face of the partition is pressed against an axial end face of the sealing rubber of the main rubber elastic body, and a seal rib protruding axially outward from the press-sealing face of the partition is more strongly pressed against the axial end face of the sealing rubber such that a fluid-tight sealing is provided axially between the sealing rubber and the partition.

According to the fourth preferred embodiment, the press-sealing face positioned at the outer peripheral edge of the axial end face of the partition is pressed against the sealing rubber provided to the axial end portion of the main rubber elastic body, so that an effective sealing is provided between the sealing rubber of the main rubber elastic body and the partition.

Moreover, the partition is provided with the seal rib protruding axially outward from the press-sealing face, and the seal rib is more strongly pressed against the axial end face of the sealing rubber than the portion of the press-sealing face which is away from the seal rib. Thus, a fluid-tight sealing is provided between the sealing rubber of the main rubber elastic body and the partition with higher reliability.

Furthermore, since the seal rib is provided on the rigid partition side, in comparison with the case where the rib is provided on the sealing rubber side, collapse, falling down, or the like of the rib due to the pressing does not occur, so that a better sealing performance can be stably obtained.

In addition, since the seal rib is provided to the press-sealing face, when the portion of the press-sealing face which is away from the seal rib is pressed against the end face of the sealing rubber, the seal rib pressed against the sealing rubber earlier inhibits escape of the sealing rubber to the radially outer side and the radially inner side, thereby more effectively realizing the sealing due to the pressing of the press-sealing face.

A fifth preferred embodiment of the present invention provides the fluid-filled vibration damping device according to the fourth preferred embodiment, wherein the outer member includes an inner flange-shaped part protruding inward from the tubular part, and at least a portion of the press-sealing face of the partition is disposed in opposition to the inner flange-shaped part in an axial direction, the sealing rubber of the main rubber elastic body is anchored to a face of the inner flange-shaped part opposed to the press-sealing face such that the sealing rubber is arranged axially between the press-sealing face and the inner flange-shaped part, and the seal rib of the partition is formed on a portion of the press-sealing face opposed to the inner flange-shaped part.

According to the fifth preferred embodiment, by the press-sealing face of the partition being pressed against the sealing rubber of the main rubber elastic body, the sealing rubber of the main rubber elastic body is compressed in the axial direction between the inner flange-shaped part of the outer member and the press-sealing face of the partition. Therefore, it is possible to improve the sealing performance by pressing the press-sealing face more strongly against the sealing rubber, and also to prevent peeling of the main rubber elastic body from the outer member due to the pressing of the press-sealing face, or the like.

Besides, since the sealing rubber is compressed in the axial direction between the seal rib and the inner flange-shaped part at the portion where the seal rib is pressed, it is possible to further improve the sealing performance by pressing the seal rib more strongly against the sealing rubber, and also to prevent peeling of the main rubber elastic body from the outer member due to the strong pressing of the seal rib, or the like.

Furthermore, for example, if the seal rib is provided in the widthwise middle portion of the press-sealing face, the seal rib limits inward deformation of the sealing rubber positioned on the radially outer side of the abutment portion of the seal rib. This may more advantageously realize the sealing due to the abutment between the press-sealing face and the sealing rubber on the radially outer side of the seal rib.

A sixth preferred embodiment of the present invention provides the fluid-filled vibration damping device according to the fourth preferred embodiment, wherein the outer member includes a stepped face on the radially inner surface of the tubular part, the radially inner surface of the tubular part on a first axial side of the stepped face comprises a rubber anchoring face to which the outer peripheral surface of the axial end portion of the main rubber elastic body is anchored, while the radially inner surface of the tubular part on a second axial side of the stepped face comprises a partition mounting face in which the partition is arranged in an inserted state, and the axial end portion of the main rubber elastic body anchored to the rubber anchoring face and the stepped face includes the sealing rubber protruding further inward than the stepped face.

According to the sixth preferred embodiment, the stepped face is provided to the radially inner surface of the tubular part of the outer member, and the outer peripheral surface of the axial end portion of the main rubber elastic body is anchored to the large-diameter rubber anchoring face of the tubular part, while the axial end face of the main rubber elastic body is anchored to the stepped face of the tubular part. By so doing, a large anchoring area of the main rubber elastic body to the outer member is obtained, so that even if a shearing force or a tensile force acts on the anchoring portion of the axial end portion of the main rubber elastic body and the tubular part of the outer member by pressing the partition against the sealing rubber of the main rubber elastic body in the axial direction, peeling of the main rubber elastic body from the outer member or the like may be prevented. Therefore, it is possible to strongly press the press-sealing face of the partition against the sealing rubber of the main rubber elastic body, thereby further enhancing the sealing performance between the axial end portion of the main rubber elastic body and the partition as well.

In this way, in the case where the stepped face is formed in the tubular part of the outer member and the axial end portion of the main rubber elastic body is also positioned further on the radially outer side of the sealing rubber, when the press-sealing face of the partition is pressed against the sealing rubber, the sealing rubber is likely to escape to the radially outer side. However, by the seal rib provided on the press-sealing face being preferentially pressed against the sealing rubber, escape of the sealing rubber to the radially outer side is prevented, thereby obtaining excellent sealing performance.

According to the present invention, both the inside dimension in the axis-perpendicular direction and the width dimension of the sealing rubber are made larger in the diagonal direction of the radially inner surface of the tubular part than in the opposite side direction thereof. Thus, at the corner of the sealing rubber, the abutting area with respect to the partition is greatly obtained, so that the position in the axial direction of the partition is more stably determined by the abutment against the axial end face of the sealing rubber, and the sealing due to the partition being pressed against the sealing rubber is also effectively realized. Moreover, the outer peripheral surface of the axial end portion of the main rubber elastic body anchored to the radially inner surface of the tubular part has a quadrangular tube shape, and the free length of the main rubber elastic body is made larger in the diagonal direction than in the opposite side direction. Accordingly, a large width dimension of the sealing rubber can be set at the corner without the need of shortening the minimum length of the free length of the main rubber elastic body.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein:

FIG. 3 is a front view of the engine mount shown in FIG. 1;

FIG. 4 is a side view of the engine mount shown in FIG. 1;

DETAILED DESCRIPTION OF EMBODIMENTS

Practical embodiments of the present invention will be described below in reference to the drawings.

FIGS. 1 to 6 show an automotive engine mount 10 as a first practical embodiment of a fluid-filled vibration damping device having a structure according to the present invention. The engine mount 10 has a structure in which an inner member 12 and an outer member 14 are elastically connected to each other by a main rubber elastic body 16. In the following description, as a general rule, the vertical direction refers to the vertical direction in FIG. 1, which is the axial direction of the engine mount 10, the lateral direction refers to the lateral direction in FIG. 1, and the front-back direction refers to the lateral direction in FIG. 2.

Figure 1:
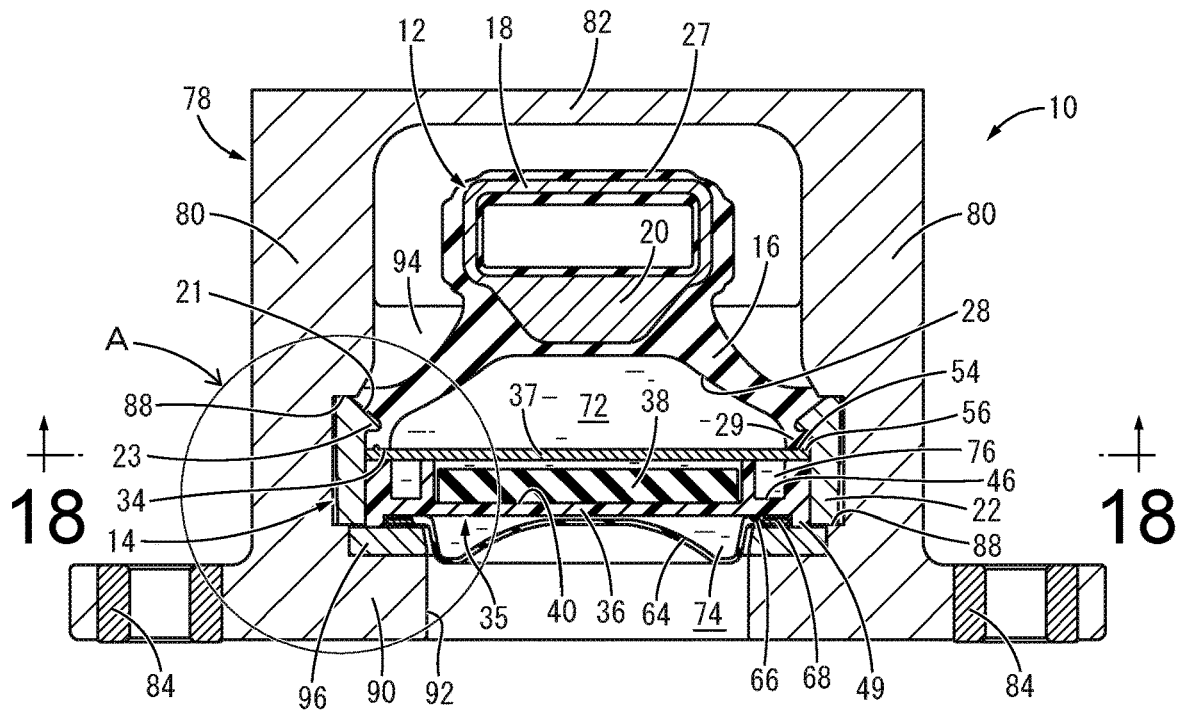
FIG. 1 is a cross-sectional view showing a fluid-filled vibration damping device in the form of an engine mount according to a first practical embodiment of the present invention, taken along line 1-1 of FIG. 4.
Figure 2:
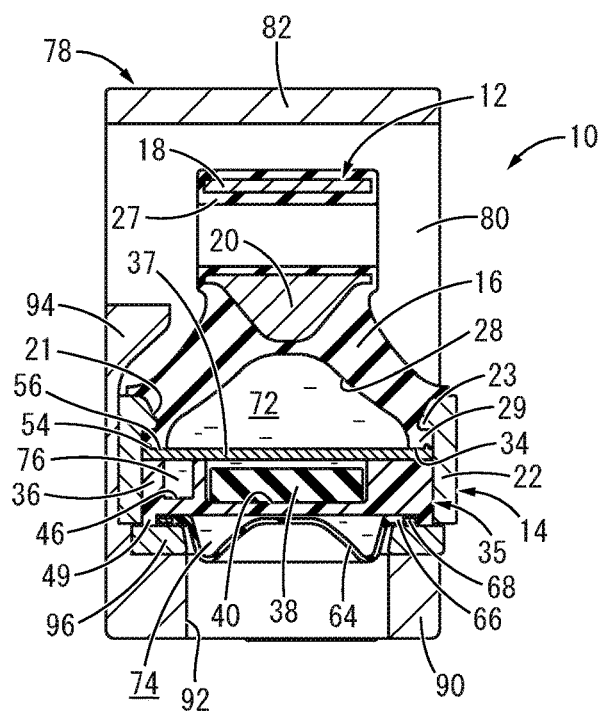
FIG. 2 is a cross-sectional view of the engine mount shown in FIG. 1, taken along line 2-2 of FIG. 3.
Figure 5:
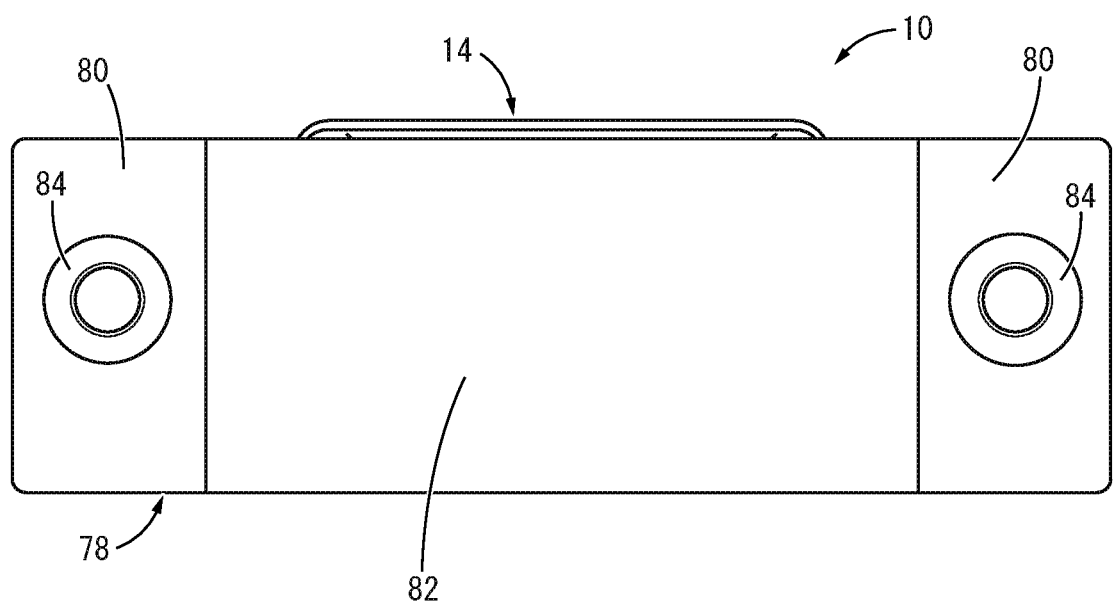
FIG. 5 is a top plan view of the engine mount shown in FIG. 1.

Described more specifically, as shown in FIGS. 1 and 2, the inner member 12 is provided with a roughly quadrangular tube-shaped fitting tube 18 extending in the front-back direction. The fitting tube 18 integrally includes, at its center portion of the lower wall, an anchoring part 20 having an approximate shape of inverted frustum of a cone whose cross-sectional area becomes gradually smaller downward, and protruding downward. The inner member 12 may preferably be formed of a lightweight material such as aluminum alloy or synthetic resin.

Figure 7:
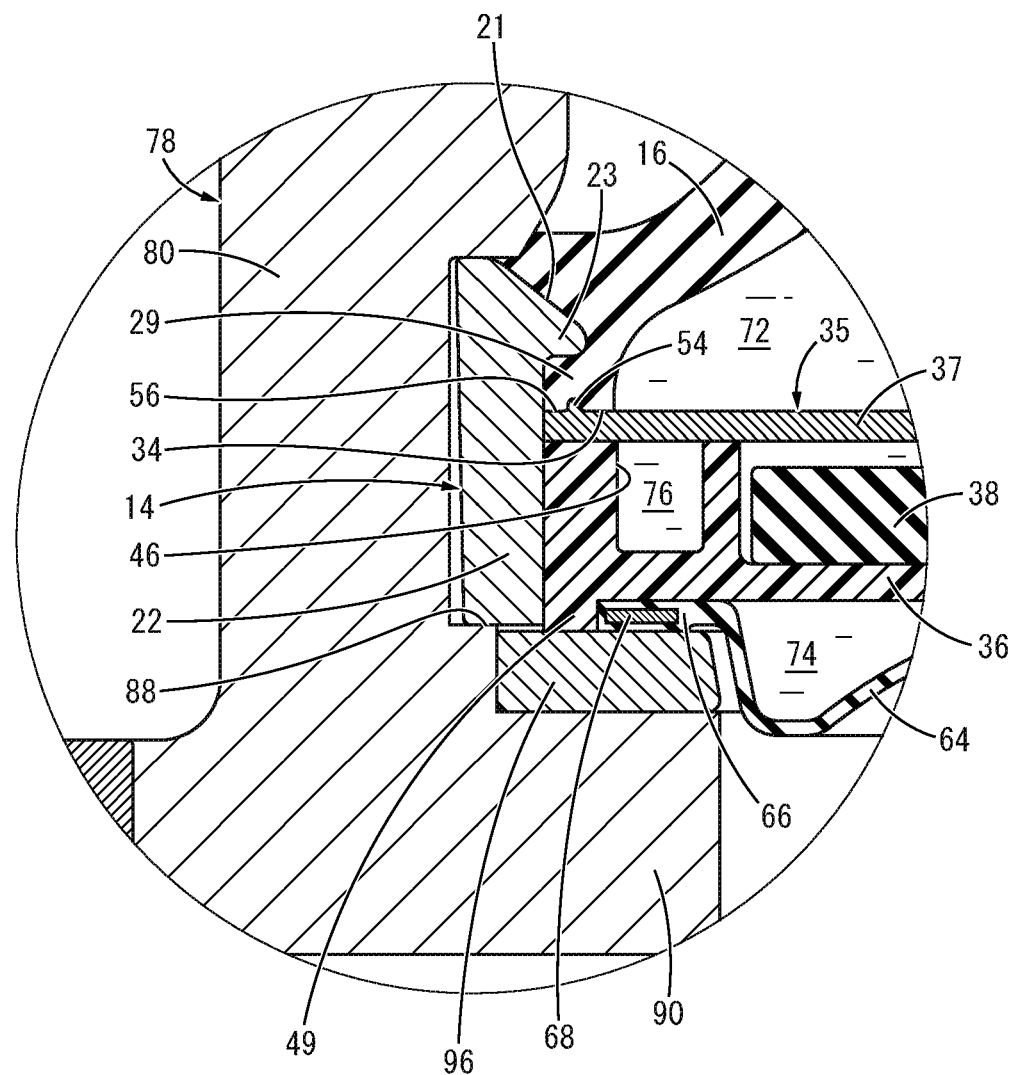
FIG. 7 is an enlarged cross-sectional view of A in FIG. 1.

As shown in FIGS. 1, 2, and 7, the outer member 14 is a high rigidity component made of metal, synthetic resin, or the like, and is provided with a thick-walled, large-diameter tubular part 22 and an inner flange-shaped part 23 protruding inward from the upper end of the tubular part 22. Besides, the upper surface of the outer member 14 includes an inclined surface 21 that is gradually inclined downward toward the radially inner side.

Figure 8:
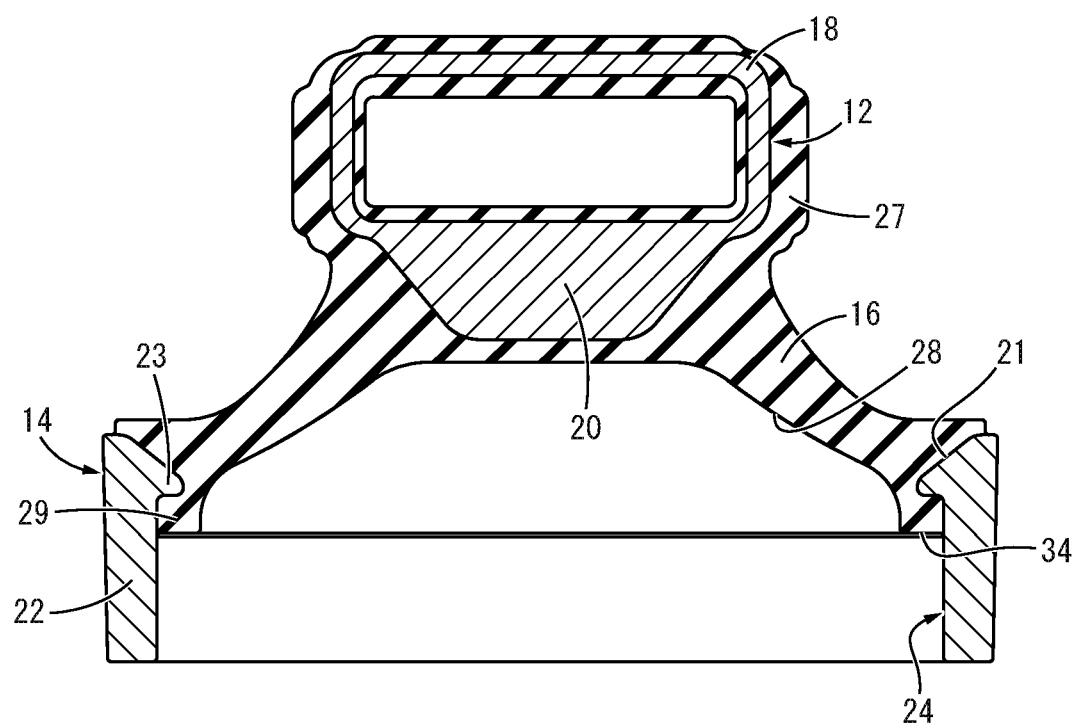
FIG. 8 is an enlarged cross-sectional view showing an integrally vulcanization molded component of a main rubber elastic body constituting the engine mount of FIG. 1.
Figure 9:
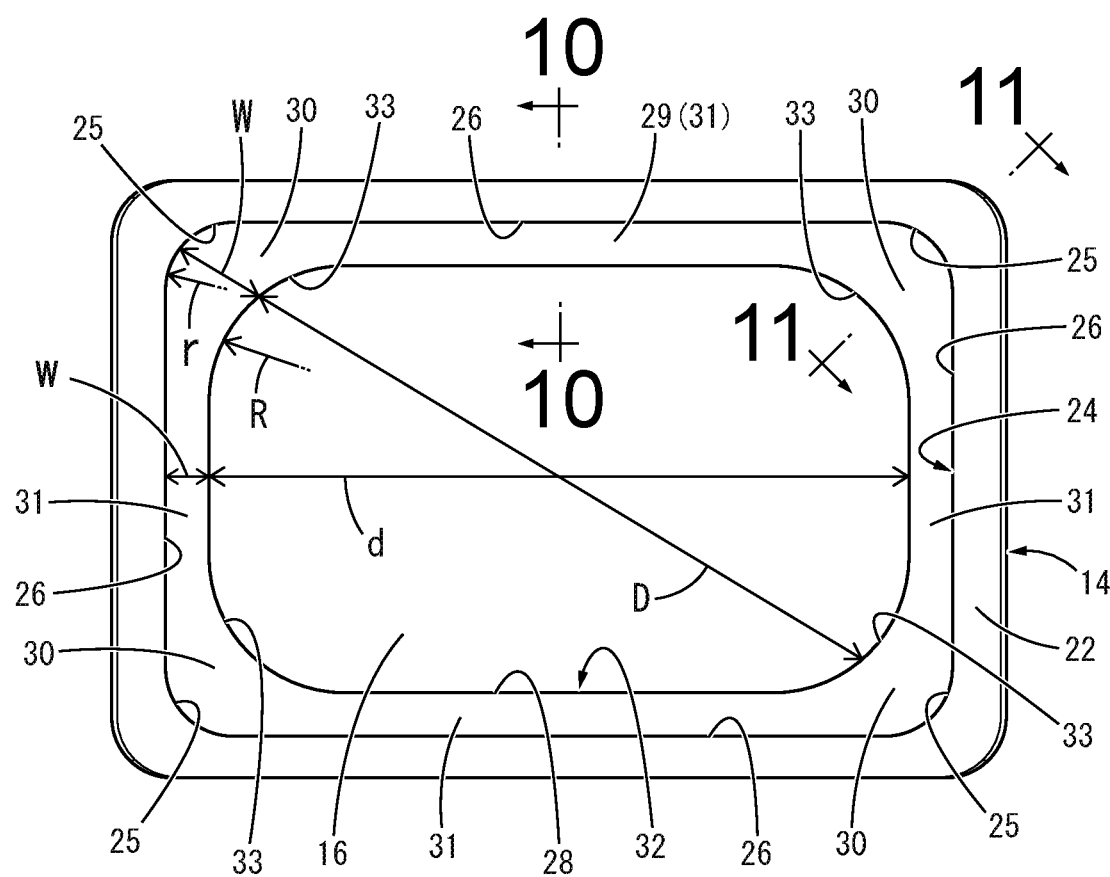
FIG. 9 is a bottom plan view of the integrally vulcanization molded component of the main rubber elastic body shown in FIG. 8.

As also shown in FIGS. 8 and 9, the tubular part 22 has a roughly quadrangular tube shape overall, the corners thereof are curved in an arcuate shape, and is shaped so as to continue smoothly without a break point or a broken line in the circumferential direction. Moreover, with the tubular part 22 of the present practical embodiment, the outer surfaces on laterally both sides are inclined inward so as to approach each other downward.

A radially inner surface 24 of the tubular part 22 has a roughly quadrangular tube shape formed by connecting four corners 25 curved in an arcuate shape and extending in the circumferential direction by four sides 26, and is shaped so as to continue smoothly without a break point or a broken line in the circumferential direction.

As shown in FIG. 7, the inner flange-shaped part 23 is integrally formed with the upper end of the tubular part 22 and protrudes toward the radially inner side. The vertical dimension of the inner flange-shaped part 23 gradually decreases toward the protruding distal end side by being configured such that the upper surface thereof has an inclined shape and the lower surface thereof spreads in the roughly axis-perpendicular direction.

Then, the inner member 12 and the outer member 14 are disposed roughly coaxially in the vertical direction, and the main rubber elastic body 16 is provided between the inner member 12 and the outer member 14. The main rubber elastic body 16 has an approximate shape of frustum of a quadrangular pyramid overall. As shown in FIGS. 1 and 2, the anchoring part 20 of the inner member 12 is bonded by vulcanization to the upper portion of the main rubber elastic body 16, while the upper portion of the outer member 14 is bonded by vulcanization to the lower portion of the main rubber elastic body 16. Furthermore, the fitting tube 18 of the inner member 12 is roughly entirely covered with a covering rubber layer 27 which is integrally formed with the main rubber elastic body 16. The main rubber elastic body 16 of the present practical embodiment takes the form of an integrally vulcanization molded component incorporating the inner member 12 and the outer member 14 (see FIGS. 8 and 9).

Besides, a large-diameter recess 28 opening downward is formed in the lower portion of the main rubber elastic body 16. The lower end portion of the main rubber elastic body 16 constituting the peripheral wall in the vicinity of the opening of the large-diameter recess 28 serves as a sealing rubber 29.

As shown in FIG. 9, the sealing rubber 29 has a roughly quadrangular tube shape including four curved corner parts 30 and four flat parts 31. Four corners of the outer peripheral surface of the sealing rubber 29, which are the outer peripheral surfaces of the curved corner parts 30, are each curved in an arcuate shape, while four corners 33 of a radially inner surface 32 of the sealing rubber 29, which are the radially inner surfaces of the curved corner parts 30, are each curved in an arcuate shape. Furthermore, in the sealing rubber 29, the curvature radius R of the corner 33 of the radially inner surface 32 is larger than the curvature radius r of the corner of the outer peripheral surface, and the width dimension W in the axis-perpendicular direction of each curved corner part 30 is larger than the width dimension w in the axis-perpendicular direction of each flat part 31. The width dimension of the sealing rubber 29 means the shortest distance from each point on the outer peripheral edge of the sealing rubber 29, which is anchored to the radially inner surface 24 of the tubular part 22 of the outer member 14, to the radially inner edge thereof.

The sealing rubber 29 is anchored to the radially inner surface 24 of the outer member 14 in a superposed state. In the present practical embodiment, the sealing rubber 29 is disposed below the inner flange-shaped part 23 of the outer member 14, and the sealing rubber 29 is anchored to the radially inner surface of the tubular part 22 and the lower surface of the inner flange-shaped part 23. The curvature radius of the corner 25 of the radially inner surface 24 of the tubular part 22 is equal to the curvature radius r of the corner of the outer peripheral surface of the sealing rubber 29. Meanwhile, the curvature radius R of the corner 33 of the radially inner surface 32 of the sealing rubber 29 is larger than the curvature radius r of the corner 25 of the radially inner surface 24 of the tubular part 22. Besides, the curved corner part 30 of the sealing rubber 29 is anchored to the corner 25 of the tubular part 22 of the outer member 14, while the flat part 31 of the sealing rubber 29 is anchored to the side 26 of the tubular part 22 of the outer member 14.

Here, as shown in FIG. 9, the sealing rubber 29 of the main rubber elastic body 16 is configured such that the inside dimension D in the axis-perpendicular direction in the diagonal direction of the tubular part 22 of the outer member 14 is made larger than the inside dimension d in the axis-perpendicular direction in the opposite side direction of the tubular part 22. Since the sealing rubber 29 of the present practical embodiment has a roughly quadrangular tube shape, the outer diameter dimension in the axis-perpendicular direction is also made larger in the diagonal direction than in the opposite side direction thereof. The diagonal direction of the radially inner surface 24 of the tubular part 22 refers to the direction of the arrow indicating the inside dimension D in the diagonal direction of the tubular part 22 in FIG. 9, while the opposite side direction of the radially inner surface 24 of the tubular part 22 refers to the direction of the arrow indicating the inside dimension d in the opposite side direction of the tubular part 22 in FIG. 9 (lateral opposite side direction) as well as the vertical direction in FIG. 9 (front-back opposite side direction) that is orthogonal to the said arrow. In the tubular part 22 of the present practical embodiment, the inside dimension in the lateral opposite side direction is made larger than the inside dimension in the front-back opposite side direction, and the inside dimension in the diagonal direction is made even larger than the larger one of the inside dimensions in the opposite side directions (namely, the inside dimension in the lateral opposite side direction). However, the inside dimensions in the opposite side directions of the tubular part 22 may be equal to each other in the front-back direction and in the lateral direction.

Figure 10:
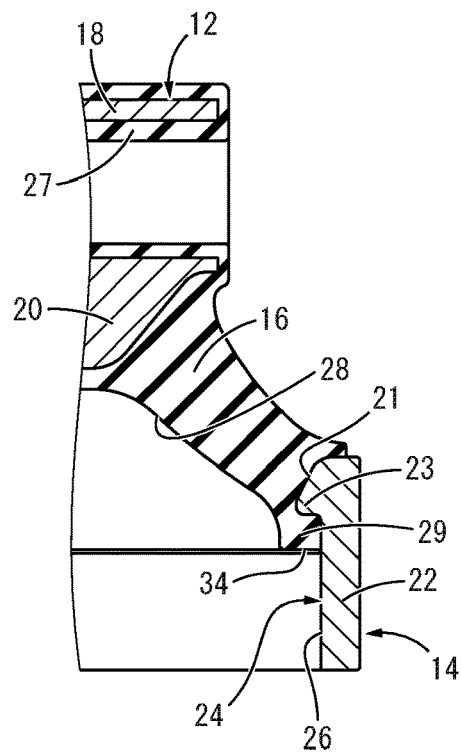
FIG. 10 is a cross-sectional view taken along line 10-10 of FIG. 9.
Figure 11:
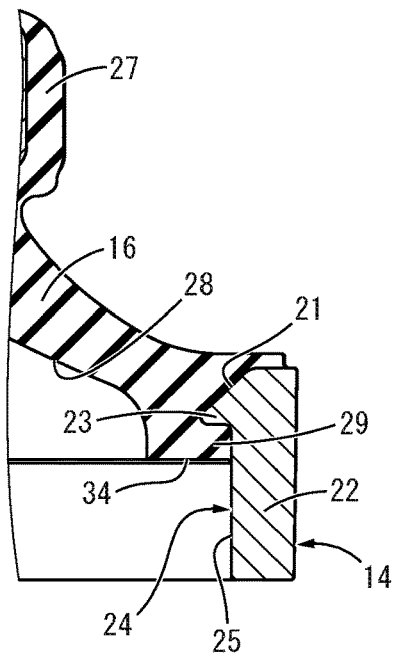
FIG. 11 is a cross-sectional view taken along line 11-11 of FIG. 9.

In this practical embodiment, as shown in FIGS. 9 to 11, the width dimension of the sealing rubber 29 is varied in the circumferential direction, and the width dimension of the sealing rubber 29 is made larger at each of the curved corner parts 30 located on both sides in each diagonal direction of the radially inner surface 24 of the tubular part 22 than at each of the flat parts 31 located on both sides in each opposite side direction of the radially inner surface 24 of the tubular part 22. The flat part 31 of the sealing rubber 29 anchored to the side 26 of the tubular part 22 extends in the front-back direction or in the lateral direction with a substantially constant cross-sectional shape, and the width dimension w of the flat part 31 of the sealing rubber 29 is substantially constant.

At the lower end of the main rubber elastic body 16, the lower end surface of the sealing rubber 29 comprises a seal abutment surface 34 spreading in the axis-perpendicular direction. The seal abutment surface 34 is provided so as to be remote downwardly in the axial direction from the surface of the main rubber elastic body 16 anchored to the upper end surface of the outer member 14 by the axial length of the sealing rubber 29 anchored to the radially inner surface of the outer member 14.

Figure 12:
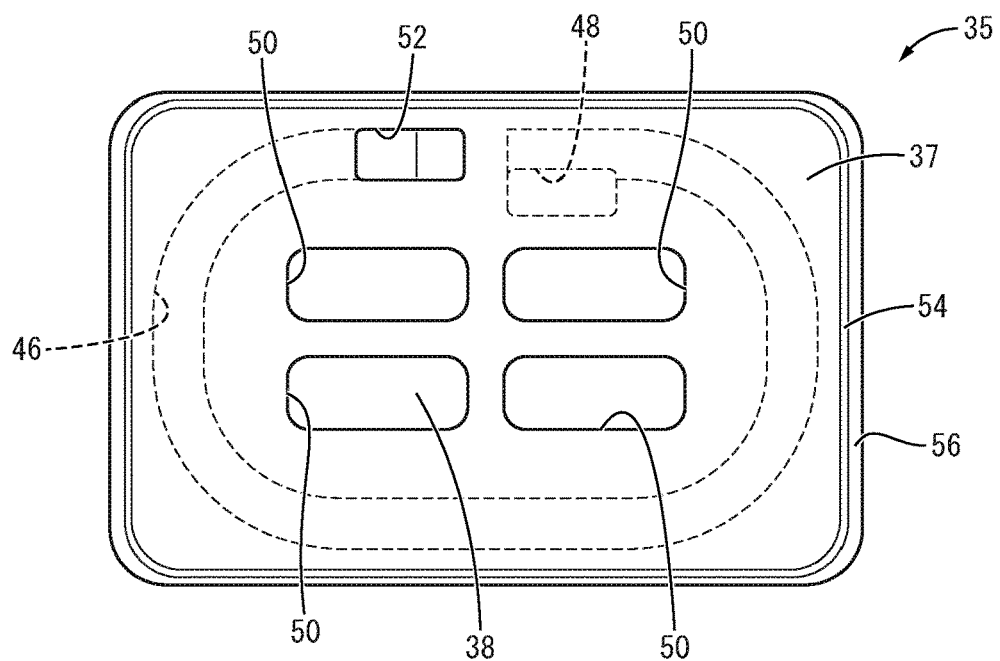
FIG. 12 is an enlarged top plan view showing a partition constituting the engine mount of FIG. 1.
Figure 13:
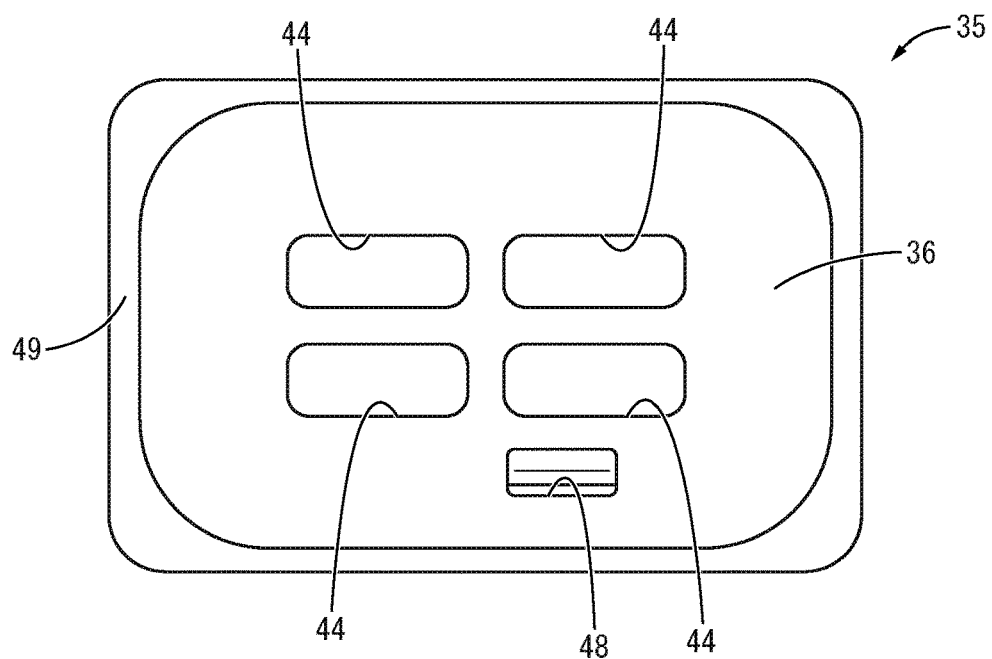
FIG. 13 is a bottom plan view of the partition shown in FIG. 12.
Figure 14:
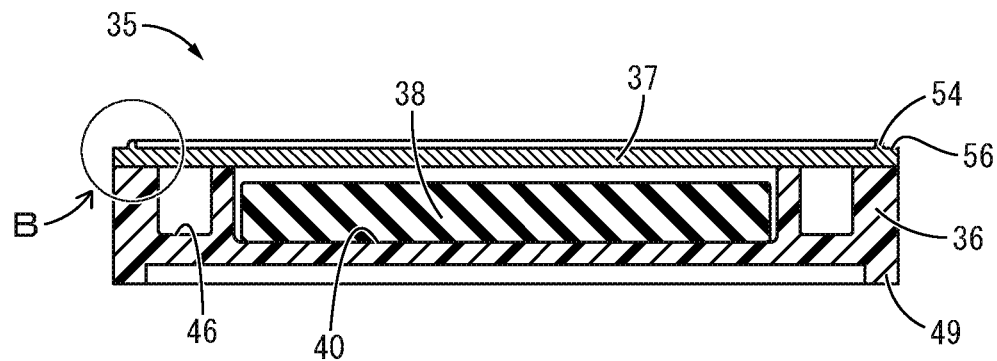
FIG. 14 is a cross-sectional view of the partition shown in FIG. 12.

In addition, a partition 35 is attached to the outer member 14. As shown in FIGS. 12 to 14, the partition 35 has a thick, roughly quadrangular plate shape overall, and in the present practical embodiment, has a structure in which a lid member 37 is attached to a partition main body 36, and a movable member 38 is disposed between the partition main body 36 and the lid member 37. The outer peripheral surface of the partition 35 has a shape substantially corresponding to the radially inner surface 24 of the tubular part 22 of the outer member 14.

The partition main body 36 has a thick, roughly quadrangular plate shape, and is a rigid component made of metal, synthetic resin, or the like. Besides, there is formed a housing recess 40 in the radially inner portion of the partition main body 36 so as to open onto the upper surface, and as shown in FIG. 13, there are formed lower through holes 44 penetrating the bottom wall of the housing recess 40 in the vertical direction. Furthermore, as shown in FIGS. 12 and 14, in the outer peripheral portion of the partition main body 36, there is formed a circumferential groove 46 extending in the circumferential direction for a length just short of once around the circumference while opening onto the upper surface, and there is formed a lower communication hole 48 so as to penetrate either one of the lengthwise ends of the circumferential groove 46. At the outer peripheral end of the partition main body 36, a positioning protrusion 49 protruding downward is integrally formed continuously about the entire circumference. It is desirable that the partition main body 36 be formed of a lightweight material having a smaller specific gravity than that of iron, and for example, by adopting aluminum alloy, synthetic resin or the like as a forming material, the weight of the engine mount 10 may be reduced.

As shown in FIGS. 12 and 14, the lid member 37 has a thin, roughly quadrangular plate shape and has substantially the same profile as that of the partition main body 36 viewed in the axial direction. Besides, the lid member 37 includes upper through holes 50 penetrating its radially inner portion in the vertical direction, and an upper communication hole 52 penetrating its outer peripheral portion in the vertical direction at a portion in the circumferential direction.

Figure 15:
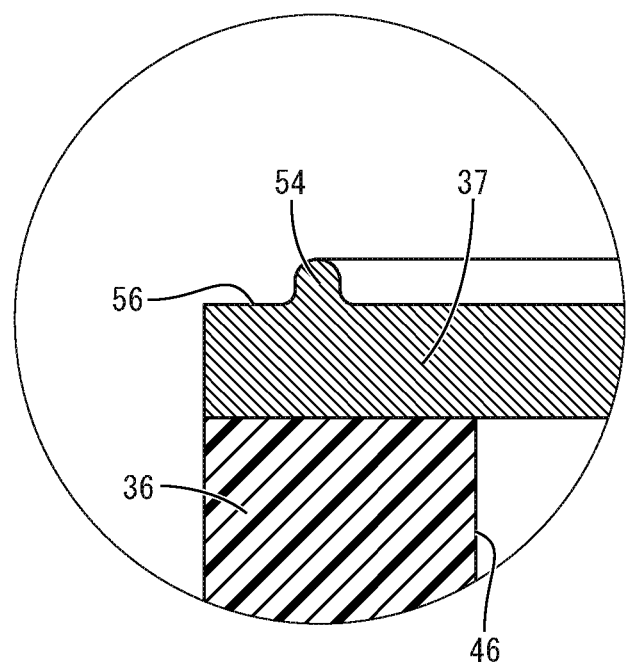
FIG. 15 is an enlarged cross-sectional view of B in FIG. 14.

Moreover, on the outer peripheral portion of the lid member 37, there is formed a seal rib 54. As shown in FIGS. 12, 14, and 15, the seal rib 54 protrudes upward from the upper surface of the lid member 37 and extends continuously about the entire circumference in the circumferential direction with a roughly semicircular cross section. Although the cross-sectional shape of the seal rib 54 can be appropriately changed, since the seal rib 54 is pressed against the sealing rubber 29 of the main rubber elastic body 16 as described later, it is desirable that at least the portion abutting against the sealing rubber 29 have a smooth surface without an edge.

The outer peripheral portion of the upper surface of the lid member 37 comprises a press-sealing face 56 which is pressed against the sealing rubber 29. In the present practical embodiment, the seal rib 54 protrudes axially upward in the radially middle portion of the press-sealing face 56.

The lid member 37 is fixed to the partition main body 36 in a superposed state on the upper surface of the partition main body 36. A method of fixing the partition main body 36 and the lid member 37 is not particularly limited. For example, the partition main body 36 and the lid member 37 may be fastened by clinching with a clinching pin protruding from the partition main body 36. Alternatively, the superposed faces of the partition main body 36 and the lid member 37 may be adhered to each other. However, fixing of the partition main body 36 and the lid member 37 is not essential in the present invention.

With the lid member 37 superposed on the upper surface of the partition main body 36, the seal rib 54 of the lid member 37 is provided so as to be positioned on the axially upper side of the positioning protrusion 49 of the partition main body 36, and is provided at a position outwardly away from the abutting portion of a supported piece 66 of a flexible film 64 which will be described later.

The opening of the housing recess 40 of the partition main body 36 is covered with the lid member 37, and the movable member 38 housed in the housing recess 40 of the partition main body 36 is arranged between the partition main body 36 and the lid member 37. As shown in FIG. 14, the movable member 38 of the present practical embodiment is a rubber elastic body having a generally circular disk shape overall, and is vertically displaceable within the housing recess 40 between the partition main body 36 and the lid member 37.

As shown in FIGS. 1 and 2, the partition 35 having such a structure is inserted from below into the tubular part 22 of the outer member 14, and is disposed on the radially inner side of the tubular part 22.

Furthermore, the press-sealing face 56 provided at the outer peripheral end of the partition 35 is pressed against the sealing rubber 29 from below in the axial direction, and at least the outer peripheral end thereof overlaps with the inner flange-shaped part 23 of the outer member 14 as viewed in the axial direction, and is disposed in opposition to the inner flange-shaped part 23 in the axial direction so as to be remote downwardly. With this configuration, the sealing rubber 29 anchored to the lower surface of the inner flange-shaped part 23 is disposed between the axially opposed faces of the inner flange-shaped part 23 of the outer member 14 and the press-sealing face 56 of the partition 35, and the sealing rubber 29 is anchored to the face of the inner flange-shaped part 23 opposed to the press-sealing face 56. Both the lower surface of the sealing rubber 29 and the press-sealing face 56 spread in the roughly axis-perpendicular direction and are substantially parallel to each other. Moreover, the lower surface of the radially middle portion of the inner flange-shaped part 23 also spreads in the roughly axis-perpendicular direction.

Moreover, the seal rib 54 protruding from the press-sealing face 56 is disposed at a position inwardly remote from the radially inner surface 24 of the tubular part 22, and is disposed at a position overlapping with the inner flange-shaped part 23 as viewed in the axial direction. In the present practical embodiment, on the press-sealing face 56 of the partition 35, the seal rib 54 is located on the radially inner side of the radial center of the portion overlapping with the inner flange-shaped part 23 as viewed in the axial direction.

Figure 16:
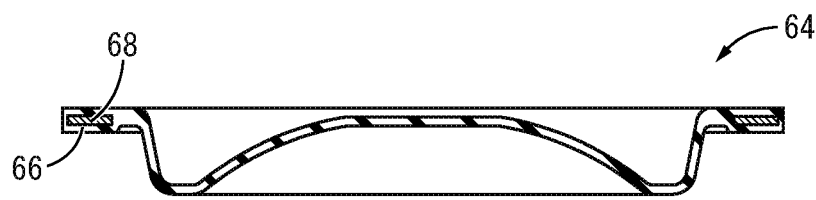
FIG. 16 is an enlarged cross-sectional view showing a flexible film constituting the engine mount of FIG. 1, taken along line 16-16 of FIG. 17.
Figure 17:
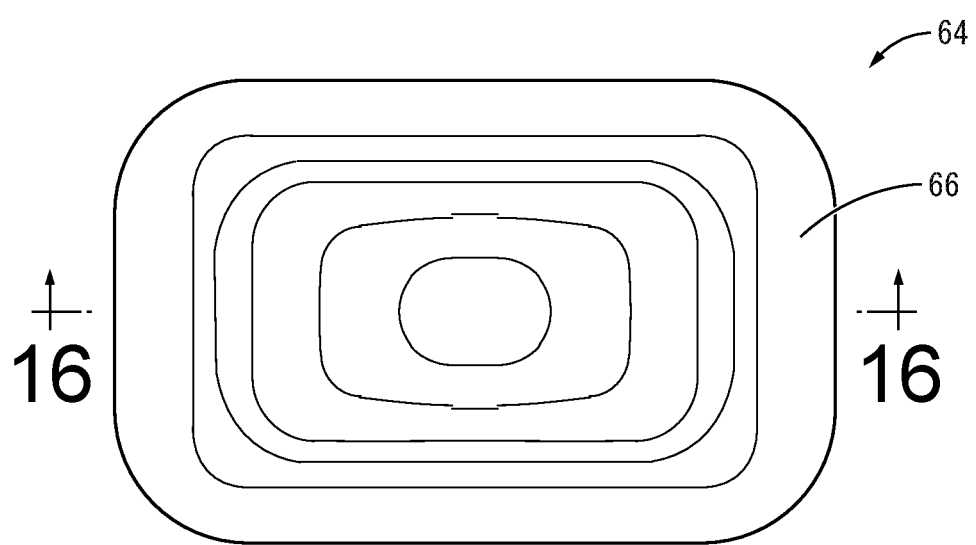
FIG. 17 is a top plan view of the flexible film shown in FIG. 16.

In addition, a flexible film 64 is disposed below the partition 35. As shown in FIGS. 16 and 17, this flexible film 64 is formed of a deformable thin rubber film, and with a slack in the vertical direction, the flexible film 64 is more easily deformable in the vertical direction. Besides, a supported piece 66 of annular plate shape is integrally formed with the outer peripheral end of the flexible film 64 so as to spread in the roughly axis-perpendicular direction, and a fastener fitting 68 of generally ring plate shape is anchored to the supported piece 66.

As shown in FIGS. 1, 2, and 7, the supported piece 66 provided with the fastener fitting 68 is overlapped with the partition 35 from below, and the supported piece 66 is inserted into the radial inside of the positioning protrusion 49 of the partition main body 36, so that the flexible film 64 is positioned with respect to the partition 35 in the axis-perpendicular direction. The flexible film 64 is fluid-tightly attached to the partition 35 by mounting an outer bracket 78 described later.

By the flexible film 64 being attached to the partition 35 in this way, a pressure-receiving chamber 72 serving as a primary liquid chamber which gives rise to internal pressure fluctuations at the time of vibration input is provided between the main rubber elastic body 16 and the partition 35, while an equilibrium chamber 74 serving as an auxiliary liquid chamber that readily permits changes in volume due to deformation of the flexible film 64 is formed between the partition 35 and the flexible film 64. The pressure-receiving chamber 72 and the equilibrium chamber 74 are arranged on axially opposite sides of the partition 35, and are filled with a non-compressible fluid. The non-compressible fluid sealed therein is not limited to a particular fluid. For example, preferably adopted as the fluid is a liquid such as water, ethylene glycol, alkylene glycol, polyalkylene glycol, silicone oil, or a mixture liquid of them. Moreover, it is desirable for the non-compressible fluid to be a low-viscosity fluid having viscosity of 0.1 Pa·s or lower.

As shown in FIGS. 1 and 2, the circumferential groove 46 of the partition main body 36 is tunnel-shaped with the upper opening covered with the lid member 37, and one end of the circumferential groove 46 communicate with the pressure-receiving chamber 72 via the upper communication hole 52 penetrating the lid member 37, while the other end thereof communicates with the equilibrium chamber 74 via the lower communication hole 48 penetrating the partition main body 36. Accordingly, an orifice passage 76 through which the pressure-receiving chamber 72 and the equilibrium chamber 74 communicate with each other is constituted by the circumferential groove 46 formed in the partition 35.

With respect to the orifice passage 76 of the present practical embodiment, the tuning frequency, which is the resonance frequency of the flowing fluid, is set to a low frequency on the order of 10 Hz corresponding to engine shake, by adjusting the ratio of the passage cross sectional area to the passage length.

The housing recess 40 of the partition 35 communicates with the pressure-receiving chamber 72 via the upper through holes 50 and communicates with the equilibrium chamber 74 via the lower through holes 44. Accordingly, the internal pressure of the pressure-receiving chamber 72 is exerted on one face of the movable member 38 and the internal pressure of the equilibrium chamber 74 is exerted on the other face of the movable member 38 disposed in the housing recess 40. When a small-amplitude vibration having a frequency higher than the tuning frequency of the orifice passage 76 is input, the movable member 38 is displaced in the vertical direction, so as to permit the substantial fluid flow between the pressure-receiving chamber 72 and the equilibrium chamber 74.

Incidentally, the pressure-receiving chamber 72 and the equilibrium chamber 74 are fluid-tightly defined by the outer bracket 78 being mounted onto the outer member 14. The outer bracket 78 is a high rigidity component made of metal, synthetic resin or the like, and as shown in FIG. 1, integrally includes left and right mounting legs 80, 80 extending vertically and a top plate 82 integrally connecting the upper ends of the left and right mounting legs 80, 80.

As shown in FIGS. 1 to 4, the left and right mounting legs 80, 80 have a plate shape having a predetermined width dimension in the front-back direction, and are arranged in opposition to each other in the lateral direction. The lower ends of the mounting legs 80, 80 have a plate shape extending laterally outward, and respective mounting nuts 84 are fixed to the lower ends of the left and right mounting legs 80, 80.

As shown in FIG. 1, the left and right mounting legs 80, 80 of the outer bracket 78 each have a connecting groove 88 which extends in the front-back direction while opening inward in the direction of opposition. The cross-sectional shapes of the connecting grooves 88 substantially correspond to the laterally outer end portions of the outer member 14. The groove width dimension (vertical inside dimension) of the connecting groove 88 is substantially equal to the vertical dimension of the laterally outer end portions of the outer member 14.

As shown in FIGS. 1 to 5, the top plate 82 has a plate shape extending in the lateral direction, and is integrally formed with the mounting legs 80, 80. Both the left and right ends of the top plate 82 are continuous with the upper ends of the mounting legs 80, 80.

Figure 6:
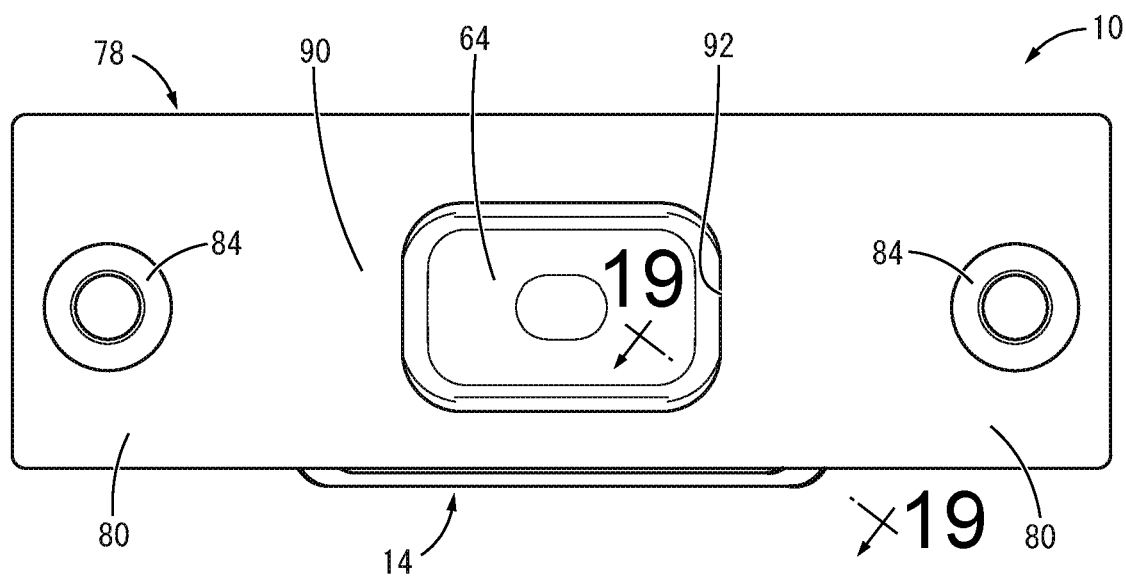
FIG. 6 is a bottom plan view of the engine mount shown in FIG. 1.

A bottom plate 90 is integrally formed with the lower portions of the left and right mounting legs 80, 80 so as to straddle the left and right mounting legs 80, 80. As shown in FIG. 6, the bottom plate 90 has a plate shape extending in the lateral direction and is arranged in opposition to the top plate 82 in the vertical direction, and is integrally connected to the lower portions of the left and right mounting legs 80, 80. Further, the bottom plate 90 is vertically penetrated by a window 92 that permits deformation of the flexible film 64. It should be noted that the bottom plate 90 is provided below the connecting grooves 88.

As shown in FIGS. 1 to 3, a front wall 94 is integrally formed with the front ends of the left and right mounting legs 80, 80. The front wall 94 has a plate shape extending in the lateral direction, and is spaced apart downward from the top plate 82. Both the left and right ends of the front wall 94 are connected to the respective mounting legs 80, 80, while the lower end thereof is connected to the bottom plate 90. The front ends of the connecting grooves 88 formed in the left and right mounting legs 80, 80 are closed by the front wall 94.

The outer bracket 78 having such a structure is mounted onto the outer member 14. That is, the mount main body, in which the partition 35 and the flexible film 64 are attached to the integrally vulcanization molded component of the main rubber elastic body 16 including the outer member 14, is horizontally inserted from the back into the region surrounded by the left and right mounting legs 80, 80, the top plate 82, and the bottom plate 90 of the outer bracket 78. As shown in FIGS. 1 and 7, the outer member 14 is inserted into the connecting grooves 88, 88 of the outer bracket 78, so that the outer bracket 78 is mounted onto the outer member 14.

There is formed a gap between the portions of the outer peripheral surface of the outer member 14 positioned on laterally both sides and the groove bottom faces of the connecting grooves 88, 88 of the outer bracket 78. This gap reduces the resistance during insertion due to interference or friction between the outer member 14 and the outer bracket 78, so that the fastening force in the axial direction of the outer member 14 and the outer bracket 78 will be efficiently obtained.

With the outer bracket 78 attached to the outer member 14, between the partition 35 and the supported piece 66 of the flexible film 64 on one side and the bottom plate 90 of the outer bracket 78 on the other side, a pressing member 96 having a roughly quadrangular ring shape is disposed. The pressing member 96 has a thickness that is smaller than a vertical deviation (step) between the groove inside face on the lower side of the connecting grooves 88, 88 and the upper surface of the bottom plate 90 of the outer bracket 78. Accordingly, it is possible to individually set the force of the connecting grooves 88, 88 in the axial direction for clamping the outer member 14, and the seal abutting force between the seal abutment surface 34 of the sealing rubber 29 on one side and the press-sealing face 56 and the seal rib 54 of the lid member 37 on the other side which is exerted by the bottom plate 90 of the outer bracket 78 being pressed against the partition 35 via the pressing member 96 in a more stable manner.

The partition 35, the supported piece 66 of the flexible film 64, and the pressing member 96 are vertically clamped between the sealing rubber 29 of the main rubber elastic body 16 and the bottom plate 90 of the outer bracket 78. By so doing, the press-sealing face 56 of the partition 35 is pressed against the sealing rubber 29 of the main rubber elastic body 16 from below, so as to provide a fluid-tight sealing between the sealing rubber 29 and the press-sealing face 56. Meanwhile, the supported piece 66 of the flexible film 64 is pressed against the lower surface of the partition 35, so as to provide a fluid-tight sealing between the partition 35 and the flexible film 64. With these configurations, the walls of the pressure-receiving chamber 72 and the equilibrium chamber 74 are fluid-tightly constituted, and the pressure-receiving chamber 72 and the equilibrium chamber 74 are fluid-tightly defined with respect to the external space, while short circuit between the pressure-receiving chamber 72 and the equilibrium chamber 74 is prevented.

Moreover, the seal rib 54 protruding upward is formed about the entire circumference on the press-sealing face 56 of the partition 35, and the seal rib 54 is more strongly pressed against the lower surface of the sealing rubber 29 of the main rubber elastic body 16. Accordingly, more effective sealing is provided between the main rubber elastic body 16 and the partition 35 at the abutting portion between the sealing rubber 29 of the main rubber elastic body 16 and the seal rib 54 of the partition 35.

In the present practical embodiment, as shown in FIG. 8, the lower surface of the sealing rubber 29 is a plane spreading in the axis-perpendicular direction across roughly its entirety including the portion abutted by the seal rib 54. Thus, by the press-sealing face 56 being pressed against the sealing rubber 29, the seal rib 54 can be more strongly pressed against the sealing rubber 29.

Furthermore, in the present practical embodiment, the seal rib 54 of the lid member 37 is disposed on the upper side of the positioning protrusion 49 of the partition main body 36, and the portion of the supported piece 66 of the flexible film 64 clamped by the partition 35 and the pressing member 96 is set inwardly away from the abutment surface between the positioning protrusion 49 of the partition 35 and the pressing member 96. This makes it possible to prevent the supported piece 66 of the flexible film 64 from being clamped vertically by an excessive force, and to largely obtain the abutting force between the seal abutment surface 34 of the sealing rubber 29 and the seal rib 54 of the lid member 37, by avoiding a drop due to clamping of the supported piece 66.

The seal rib 54 of the present practical embodiment extends in the circumferential direction with a roughly semicircular cross section, and its surface has a smoothly curved shape without a break point or a broken line. Thus, occurrence of cracks in the sealing rubber 29 due to the pressing of the seal rib 54 or the like is prevented.

In addition, the seal rib 54 is pressed against the lower surface of the sealing rubber 29 prior to the other portion of the press-sealing face 56. Thus, when the other portion of the press-sealing face 56 is pressed against the lower surface of the sealing rubber 29, deformation of the sealing rubber 29 in the axis-perpendicular direction is restricted by the seal rib 54, and escape of the sealing rubber 29 to the radially inner side and to the radially outer side is suppressed. As a result, it is possible to press the press-sealing face 56 more strongly against the sealing rubber 29, thereby improving the sealing performance.

Further, since the seal rib 54 is provided on the partition 35 to be rigid, when the seal rib 54 is pressed against the sealing rubber 29 of the main rubber elastic body 16, the seal rib 54 is pressed so as to be wedged into the sealing rubber 29 without collapsing or falling down in the direction of protrusion. This makes it possible to obtain a large contact pressure between the seal rib 54 and the sealing rubber 29, so that even if the press-sealing face 56 of the partition 35 is pressed relatively weakly against the sealing rubber 29 of the main rubber elastic body 16, excellent sealing performance can be obtained. In addition, since the seal rib 54 is rigid, it is also possible to effectively restrict the escape of the sealing rubbers 29 to the radially inner side and the radially outer side by pressing of the seal rib 54. Note that the seal rib 54 of the present practical embodiment gradually narrows toward the protruding distal end side, thereby more effectively obtaining the large contact pressure between the seal rib 54 and the sealing rubber 29.

Besides, the inner flange-shaped part 23 is provided to the outer member 14, and the sealing rubber 29 is vertically compressed between opposed faces of the inner flange-shaped part 23 of the outer member 14 and the press-sealing face 56 of the partition 35. This makes it possible to stably press the press-sealing face 56 against the sealing rubber 29 with a predetermined contact pressure, thereby realizing the desired sealing performance with excellent reliability.

Moreover, in the present practical embodiment, since the seal rib 54 provided on the press-sealing face 56 of the partition 35 is disposed at a position overlapping with the inner flange-shaped part 23 of the outer member 14 in the axial direction, the sealing rubber 29 is vertically compressed between the seal rib 54 and the inner flange-shaped part 23. With this configuration, even if the seal rib 54 is strongly pressed against the sealing rubber 29, damage to the sealing rubber 29, peeling of the sealing rubber 29 from the outer member 14 and the like are prevented.

Figure 18:
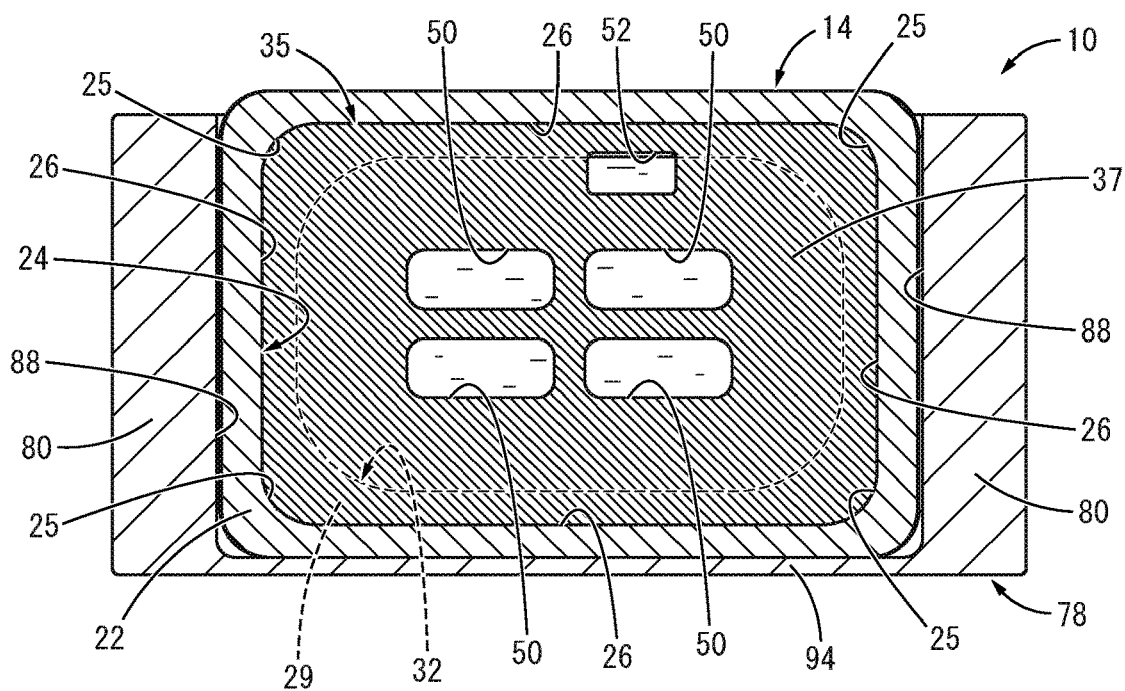
FIG. 18 is an enlarged cross-sectional view showing a principal part of the engine mount of FIG. 1, taken along line 18-18 of FIG. 1.
Figure 19:
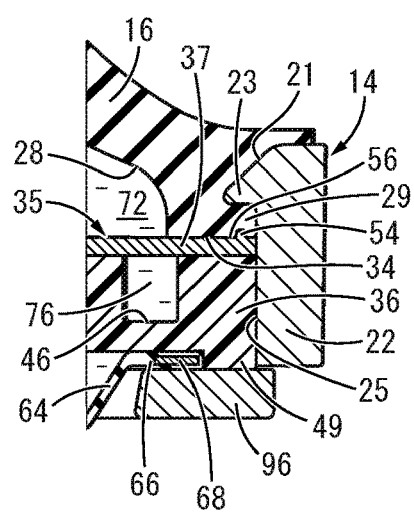
FIG. 19 is a cross-sectional view taken along line 19-19 of FIG. 6.

Here, as shown in FIGS. 18 and 19, the width dimension of the sealing rubber 29 of the main rubber elastic body 16 is made larger at the curved corner part 30 than at the flat part 31. Thus, the abutting area between the sealing rubber 29 and the partition 35 in the axial direction is greatly obtained at the curved corner part 30. With this arrangement, the partition 35 is more effectively positioned in the axial direction with respect to the outer member 14, and sufficient sealing performance can be ensured at the corners where the sealing performance is prone to be low. In FIG. 18, the radially inner surface 32 of the sealing rubber 29 is indicated by the dashed line.

Furthermore, since the radially inner surface 24 of the tubular part 22 of the outer member 14 has a roughly quadrangular tube shape, the outer peripheral surface of the sealing rubber 29 of the main rubber elastic body 16 anchored to the radially inner surface 24 of the tubular part 22 has a roughly quadrangular tube shape. Therefore, the main rubber elastic body 16 is configured such that the free length in the diagonal direction of the tubular part 22 is longer than the free length in the opposite side direction thereof. Thus, even if the width dimension W of the sealing rubber 29 is set to be large at the corner of the main rubber elastic body 16, by obtaining the inside dimension of the sealing rubber 29 more largely in the diagonal direction than in the opposite side direction, the minimum length of the free length of the main rubber elastic body 16 is never shortened, thereby minimizing or eliminating adverse influence on the durability and the spring characteristics of the main rubber elastic body 16.

In the present practical embodiment in particular, the corner 33 of the radially inner surface 32 of the sealing rubber 29 is curved in an arcuate shape, and the radially inner surface 32 of the sealing rubber 29 smoothly continues in the circumferential direction. This may achieve improvement in durability, stabilization in sealing, and the like owing to dispersion of stress at the time of vibration input or the like. Besides, as shown in FIG. 19, since the sealing rubber 29 is pressed against not only the partition main body 36 but also the lid member 37, the partition main body 36 and the lid member 37 are readily held in a superposed state. In FIG. 19, the illustration of the outer bracket 78 is omitted.

In addition, since the tubular part 22 of the outer member 14 has a roughly quadrangular tube shape, even when the installation space of the engine mount 10 is small in the vehicle, the piston surface area of the main rubber elastic body 16 can be efficiently obtained, thereby effectively attaining the vibration damping effect based on the flow action of the fluid at the time of vibration input.

Further, the seal abutment surface 34 of the sealing rubber 29 is remote downwardly from the surface of the main rubber elastic body 16 anchored to the inclined surface 21 of the outer member 14. Thus, even when a tensile force in the axial direction is exerted on the main rubber elastic body 16, the main load bearing surface of the outer member 14 side is the inclined surface 21 provided on the upper end surface of the outer member 14. Since the transmission of the tensile force to the seal abutment surface 34 in the main rubber elastic body 16 is suppressed, the contact pressure between the seal abutment surface 34 of the sealing rubber 29 and the press-sealing face 56 of the partition 35 is more stably maintained.

Figure 20:
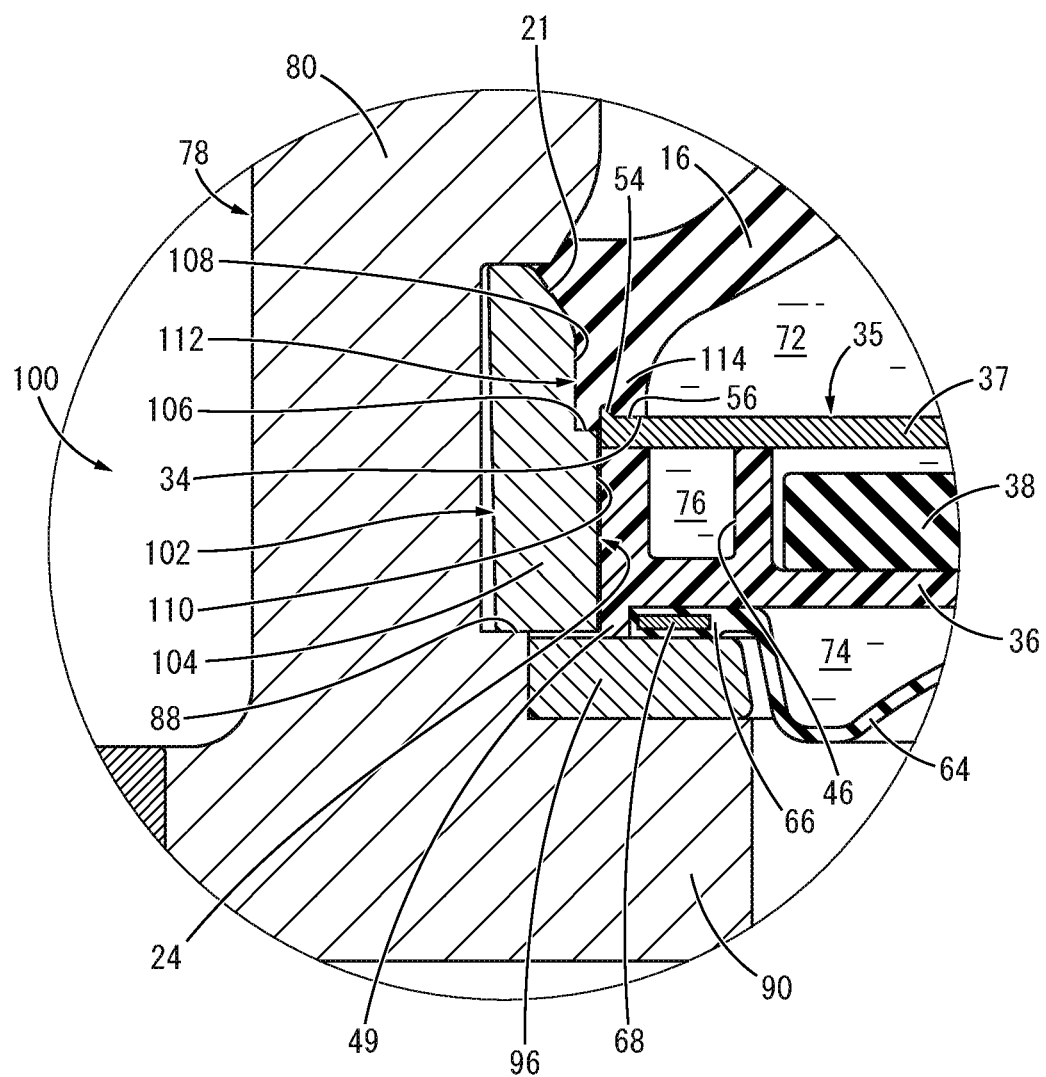
FIG. 20 is a cross-sectional view showing a principal part of an engine mount according to a second practical embodiment of the present invention.

FIG. 20 shows a principal part of an engine mount 100 serving as a fluid-filled vibration damping device according to a second practical embodiment of the present invention. In the following description, components and parts that are substantially identical with those in the first practical embodiment will be assigned like symbols and not described in any detail.

Described more specifically, the engine mount 100 is provided with an outer member 102. The outer member 102 includes a tubular part 104 having a roughly quadrangular tube shape, and a stepped face 106 extending in the roughly axis-perpendicular direction is provided on the axially middle portion of the radially inner surface 24 of the tubular part 104. Accordingly, the radially inner surface 24 of the tubular part 104 is configured such that the upper side (i.e., the first axial side) of the stepped face 106 comprises a large-diameter rubber anchoring face 108, while the lower side (i.e., the second axial side) of the stepped face 106 comprises a small-diameter partition mounting face 110.

The radially inner surface 24 of the tubular part 104 has a roughly quadrangular tube shape overall and is curved in an arcuate shape at the corners, so as to have a smoothly continuous shape without a break point or a broken line in the circumferential direction. In the present practical embodiment, the rubber anchoring face 108 and the partition mounting face 110 of the tubular part 104 each have a roughly quadrangular tube shape in which the corners are curved in an arcuate shape. Further, the outer peripheral surface of the tubular part 104 of the present practical embodiment has a roughly quadrangular tube shape that corresponds to the radially inner surface thereof.

The outer peripheral surface of an annular anchoring end 112 constituting the axially lower end portion of the main rubber elastic body 16 is anchored to the rubber anchoring face 108 of the tubular part 104 of the outer member 102, and the lower end surface of the annular anchoring end 112 of the main rubber elastic body 16 is anchored to the stepped face 106 of the tubular part 104.

In addition, the width dimension of the stepped face 106 is made smaller than the width dimension of the lower end surface of the annular anchoring end 112 of the main rubber elastic body 16, and the radially inner portion of the annular anchoring end 112 comprises a sealing rubber 114 protruding further inward than the stepped face 106. That is, the sealing rubber 114 of the main rubber elastic body 16 protrudes further inward than the small-diameter partition mounting face 110 set on the radially inner surface of the tubular part 104. Although the width dimension of the sealing rubber 114 may be roughly constant about the entire circumference, in the present practical embodiment, the width dimension of the sealing rubber 114 is larger at the curved corner part of the annular anchoring end 112 than at the flat part thereof.

Besides, the partition 35 is inserted in the tubular part 104 of the outer member 102, and the partition 35 is disposed on the radially inner side of the partition mounting face 110 of the tubular part 104.

Moreover, the press-sealing face 56 provided on the upper surface of the outer peripheral end of the partition 35 is pressed against the sealing rubber 114 of the main rubber elastic body 16 from below, and the seal rib 54 provided on the press-sealing face 56 is more strongly pressed against the sealing rubber 114 from below. The seal rib 54 of the present practical embodiment is provided on the outer peripheral edge of the partition 35, and is pressed against the outer peripheral end of the sealing rubber 114. By so doing, a fluid-tight sealing is provided axially between the sealing rubber 114 of the main rubber elastic body 16 and the press-sealing face 56 of the partition 35.

Note that the press-sealing face 56 and the seal rib 54 provided to the outer peripheral end of the partition 35 are positioned on the radially inner side than the partition mounting face 110 and arranged so as not to overlap with the tubular part 104 as viewed in the axial direction.

With the engine mount 100 having such a structure according to the present practical embodiment, the outer peripheral surface of the annular anchoring end 112 of the main rubber elastic body 16 is anchored to the large-diameter rubber anchoring face 108 of the tubular part 104, while the lower surface of the annular anchoring end 112 of the main rubber elastic body 16 is anchored to the stepped face 106 of the tubular part 104, so as to obtain a large anchoring area of the main rubber elastic body 16 with respect to the outer member 102.

Therefore, even when the press-sealing face 56 of the partition 35 is pressed against the sealing rubber 114 of the main rubber elastic body 16 in the axial direction and a shearing force or a tensile force acts between the annular anchoring end 112 of the main rubber elastic body 16 and the tubular part 104 of the outer member 102, peeling of the main rubber elastic body 16 from the outer member 102 or the like will be prevented.

This makes it possible to strongly press the press-sealing face 56 of the partition 35 against the sealing rubber 114 of the main rubber elastic body 16, thereby further enhancing the sealing performance between the axial end portion of the main rubber elastic body 16 and the partition 35 as well.

In particular, in the structure in which the annular anchoring end 112 of the main rubber elastic body 16 is anchored to the tubular part 104 of the outer member 102 on the radially outer side than the sealing rubber 114, escape of the sealing rubber 114 to the radially outer side is likely to occur. However, since the seal rib 54 is provided on the outer peripheral edge of the press-sealing face 56, the escape of the sealing rubber 114 is suppressed, thereby advantageously realizing the sealing.

Although the practical embodiments of the present invention have been described in detail above, the present invention is not limited by the specific description thereof. For example, it is sufficient for the outer member 14 to include the tubular part 22 anchored to the main rubber elastic body 16, and the outer member 14 may also include a structure for attachment to a vehicle body provided to the outer bracket 78 or the like.

Furthermore, the shape of the tubular part 22 of the outer member 14 is not particularly limited as long as the radially inner surface 24 has a quadrangular tube shape. Specifically, the outer peripheral surface of the tubular part 22 may be a cylindrical shape, an irregular tube shape, a polygonal tube shape other than a quadrangular one, or the like in addition to the quadrangular tube shape exemplified in the preceding practical embodiments.

In addition, it is desirable that for all of the radially inner surface 24 of the tubular part 22 and the corresponding outer peripheral surfaces of the sealing rubber 29 and the partition 35, the corners have an arcuate curved shape, but it is not essential for them to have a curved shape.

Moreover, in the preceding practical embodiment, the entire press-sealing face 56 of the partition 35 is constituted by the lid member 37. However, for example, at least a portion of the press-sealing face 56 may be constituted by the partition main body 36. Besides, the cross-sectional shape of the seal rib 54 is merely exemplary, and can be appropriately changed according to required sealing performance, durability, and the like. As a specific example, in the preceding practical embodiment, the seal rib 54 is formed on the lid member 37, and the lid member 37 is partially thickened at the formation site of the seal rib 54. However, it would also be acceptable to form a seal rib by pressing the outer peripheral portion of the lid member made of a flat plate material so that the upper surface side thereof becomes convex.

What is claimed is:

1. A fluid-filled vibration damping device comprising:
an inner member;
an outer member including a tubular part;
a main rubber elastic body elastically connecting the inner member and the outer member to each other;
a partition disposed on a radially inner side of the tubular part of the outer member;
a primary liquid chamber and an auxiliary liquid chamber formed on opposite sides of the partition, the primary liquid chamber and the auxiliary liquid chamber being filled with a non-compressible fluid; and
an orifice passage through which the primary liquid chamber and the auxiliary liquid chamber communicate with each other, the orifice passage being formed in the partition, wherein
a radially inner surface of the tubular part of the outer member has a quadrangular tube shape,
the partition has a quadrangular plate shape corresponding to the radially inner surface of the tubular part, and is disposed on the radially inner side of the tubular part,
an outer peripheral surface of an axial end portion of the main rubber elastic body is anchored to the radially inner surface of the tubular part,
an annular sealing rubber pressed against an outer peripheral edge of an axial end face of the partition is provided to the axial end portion of the main rubber elastic body,
in a cross-section perpendicular to an axis of the sealing rubber, (i) an inside dimension (D) in a diagonal direction of the radially inner surface of the tubular part is larger than (ii) an inside dimension (d) in a direction intersecting two sides of the radially inner surface of the tubular part that are opposite to one another, and
in the cross-section, (i) a width dimension (W) of the sealing rubber in the diagonal direction of the radially inner surface of the tubular part is larger than (ii) a width dimension (w) of the sealing rubber in the direction intersecting the two sides of the radially inner surface of the tubular part that are opposite to one another.

2. The fluid-filled vibration damping device according to claim 1, wherein a corner of the radially inner surface of the tubular part has an arcuate curved surface, and a corner of a radially inner surface of the sealing rubber positioned in the diagonal direction of the radially inner surface of the tubular part has an arcuate curved surface whose curvature radius is larger than that of the corner of the radially inner surface of the tubular part.

3. The fluid-filled vibration damping device according to claim 1, wherein a portion of the sealing rubber of the main rubber elastic body, the portion being positioned on the radially inner side of a side of the radially inner surface of the tubular part, extends in a circumferential direction with a substantially constant width dimension.

4. The fluid-filled vibration damping device according to claim 1, wherein
   a press-sealing face positioned on the outer peripheral edge of the axial end face of the partition is pressed against an axial end face of the sealing rubber of the main rubber elastic body, and
   a seal rib protruding axially outward from the press-sealing face of the partition is more strongly pressed against the axial end face of the sealing rubber such that a fluid-tight sealing is provided axially between the sealing rubber and the partition.

5. The fluid-filled vibration damping device according to claim 4, wherein
   the outer member includes an inner flange-shaped part protruding inward from the tubular part, and at least a portion of the press-sealing face of the partition is disposed in opposition to the inner flange-shaped part in an axial direction,
   the sealing rubber of the main rubber elastic body is anchored to a face of the inner flange-shaped part opposed to the press-sealing face such that the sealing rubber is arranged axially between the press-sealing face and the inner flange-shaped part, and
   the seal rib of the partition is formed on a portion of the press-sealing face opposed to the inner flange-shaped part.

6. The fluid-filled vibration damping device according to claim 4, wherein
   the outer member includes a stepped face on the radially inner surface of the tubular part,
   the radially inner surface of the tubular part on a first axial side of the stepped face comprises a rubber anchoring face to which the outer peripheral surface of the axial end portion of the main rubber elastic body is anchored, while the radially inner surface of the tubular part on a second axial side of the stepped face comprises a partition mounting face in which the partition is arranged in an inserted state, and
   the axial end portion of the main rubber elastic body anchored to the rubber anchoring face and the stepped face includes the sealing rubber protruding further inward than the stepped face.

\* \* \* \* \*